(12) United States Patent
Chenu

(10) Patent No.: US 9,354,845 B2
(45) Date of Patent: May 31, 2016

(54) DEVICE AND METHOD FOR MAINTENANCE FILTERING ON A FLOW OF CODED INPUTS/OUTPUTS

(75) Inventor: Eric Chenu, Chaville (FR)

(73) Assignee: SIEMENS S.A.S., St. Denis (FR)

( * ) Notice: Subject to any disclaimer, the term of this patent is extended or adjusted under 35 U.S.C. 154(b) by 323 days.

(21) Appl. No.: 14/005,316

(22) PCT Filed: May 30, 2011

(86) PCT No.: PCT/EP2011/058840
§ 371 (c)(1),
(2), (4) Date: Oct. 11, 2013

(87) PCT Pub. No.: WO2012/123037
PCT Pub. Date: Sep. 20, 2012

(65) Prior Publication Data
US 2014/0040337 A1    Feb. 6, 2014

(30) Foreign Application Priority Data
Mar. 16, 2011  (EP) ................................. 11290135

(51) Int. Cl.
*G06F 11/00*  (2006.01)
*G06F 7/58*   (2006.01)
*G06F 11/07*  (2006.01)

(52) U.S. Cl.
CPC ............ *G06F 7/582* (2013.01); *G06F 11/0796* (2013.01)

(58) Field of Classification Search
CPC . G06F 7/582; G06F 11/0796; G06F 11/2236; G06F 11/3656; G06F 11/3648
USPC .......................................................... 714/30
See application file for complete search history.

(56) References Cited

U.S. PATENT DOCUMENTS 4,556,976 A    12/1985   Howarth
4,740,972 A     4/1988   Rutherford, Jr.
(Continued)

FOREIGN PATENT DOCUMENTS

GB         2188456       9/1987

*Primary Examiner* — Yair Leibovich
(74) *Attorney, Agent, or Firm* — Laurence Greenberg; Werner Stemer; Ralph Locher

(57) ABSTRACT

A method and a device for maintenance filtering to process a flow of m coded incoming messages $Es_j$ each with $n_j$ Inputs/Outputs $es_{i,j}$, a checksum $\Sigma Ses_{i,j}$ of signatures $Ses_{i,j}$, and a date $d_j$. outgoing message $Esm_j$ is generated from each incoming message with $n_j$ Inputs/Outputs $esm_{i,j}$, a checksum $\Sigma Sesm_{i,j}$ of signatures $Sesm_{i,j}$, and the date $d_j$. The novel maintenance filtering device maintains at least one state of at least one Input/Output $es_{i,j}$ of at least one of the incoming messages $Es_j$ for a period of time $T_i$ whatever the state of an Input/Output of an incoming message consecutive to the incoming message $Es_j$ by generating at least one outgoing message wherein the state of the $i^{th}$ Input/Output of the outgoing message is equal to the state of the Input/Output $es_{i,j}$ of incoming message $Es_j$. The maintenance filtering device includes a calculation device, a pseudo-random generator, and a compensation table.

15 Claims, 2 Drawing Sheets

(56) References Cited

U.S. PATENT DOCUMENTS

| | | | |
|---|---|---|---|
| 4,823,307 A | 4/1989 | Megara et al. | |
| 5,125,090 A | 6/1992 | Rutherford, Jr. | |
| 6,760,752 B1* | 7/2004 | Liu | H04L 63/0428 709/206 |
| 2002/0085710 A1* | 7/2002 | Ananth | H04L 9/065 380/37 |
| 2008/0130895 A1* | 6/2008 | Jueneman | H04L 9/3066 380/277 |
| 2011/0295815 A1* | 12/2011 | Mandagere | G06F 11/1004 707/690 |

* cited by examiner

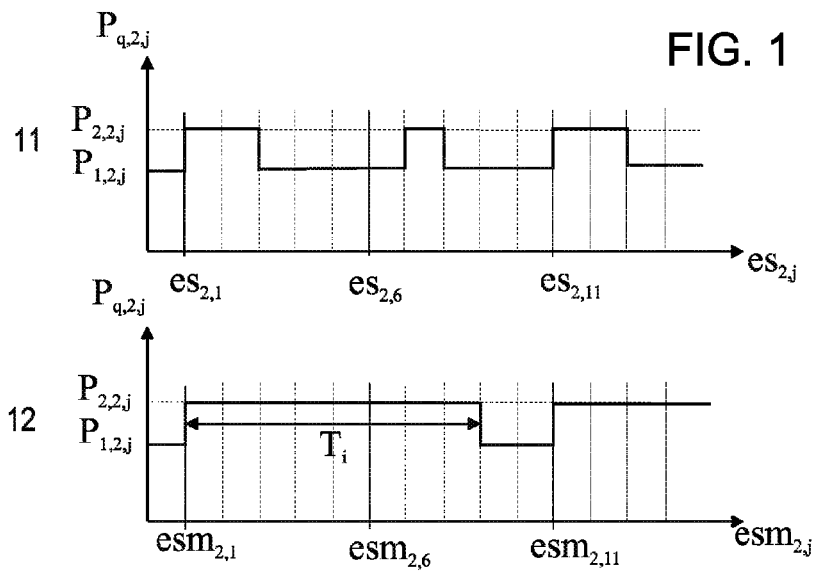
FIG. 1
FIG. 2
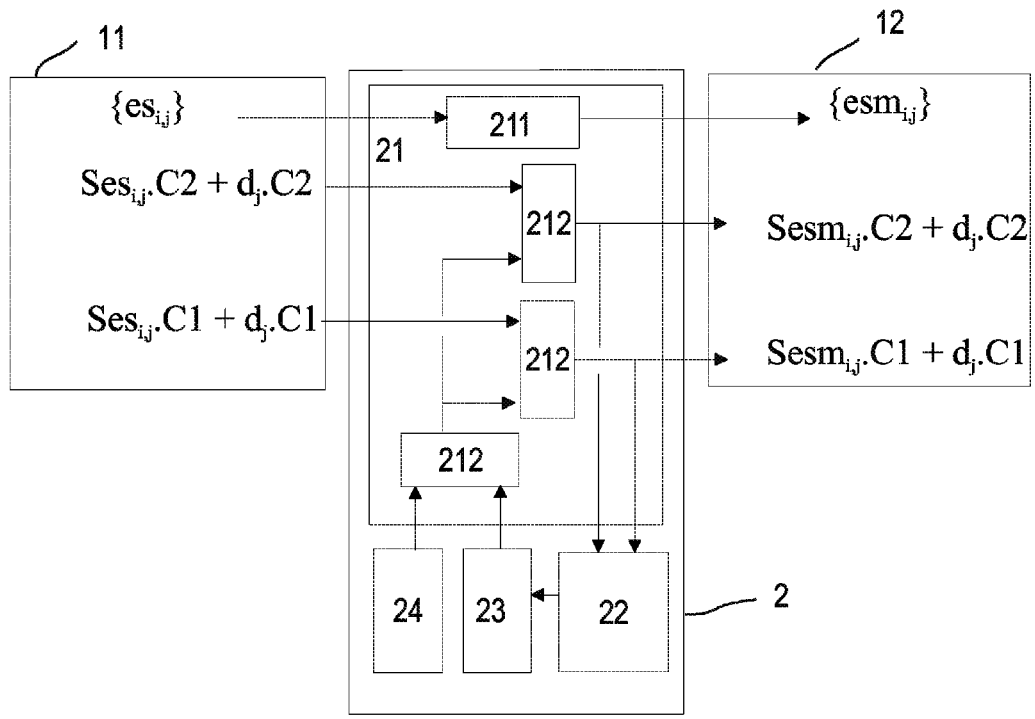

DEVICE AND METHOD FOR MAINTENANCE FILTERING ON A FLOW OF CODED INPUTS/OUTPUTS

BACKGROUND OF THE INVENTION

Field of the Invention

The present invention relates to a method and a device for maintenance filtering on a flow of coded Inputs/Outputs.

In particular, the invention relates to protected data processing systems with applications in the field of guided vehicles, especially in the field of railways, where the protection of computers associated with ground-based and/or onboard automatic systems must be guaranteed in order to detect any fault likely to affect the safety of the guided vehicle. The present invention relates more particularly to a device and a method for calculating a checksum intended to protect an outgoing message generated from an incoming message with an Input/Output either intended to be maintained, or intended not to be maintained.

"Guided vehicle" refers to means of public transport such as buses, trolley buses, trams, metros, trains or train units, etc., and to load lifting means such as, for example, travelling cranes, for which the safety aspect is very important and for which guidance is provided by at least one rail defining at least one transportation line or track, i.e. at least one path for said means of transport.

Numerous automatic systems linked to the operation of guided vehicles, such as for example door opening or lowering of a safety barrier, are run by software. Since such automatic systems may affect the safety of the vehicle, it is necessary to be able to guarantee the safety of their execution and thus to monitor the execution of the software used to implement them.

A software or application protection method known to a person skilled in the art is based on a use of a coded safety processor (CSP), in particular that developed by the Applicant under the brand DIGISAFE. The basic principle of the coded safety processor is to associate each item of incoming digital information intended to be processed by an application with a code to be processed and transmitted with said item of incoming digital information during the execution of said application, so that the item of outgoing digital information resulting from said processing of the item of incoming digital information is itself coded. Since the correlation of the coding of the item of incoming digital information and the coding of the item of outgoing digital information is known as a function of said application, analysis of the coding of the item of outgoing digital information makes it possible to determine whether the application has been executed correctly. This basic principle has been used to guarantee the safety of numerous automatic systems, the level of safety being able to be chosen as a function of the size of the code.

The coded safety processor is also currently used to keep an item of coded incoming and/or outgoing digital information safe or, in other words, to maintain a coded Input and/or Output at a predefined value. Let us consider for example an optical barrier which, when cut by a train, sends a signal triggering the lowering of safety barriers. The signal sent by said optical barrier comprises two states: a first state indicating the absence of a train, corresponding to raised safety barriers and to a value 0 of said signal, and a second state indicating the presence of a train, corresponding to lowered safety barriers and to a value 1 of said signal. For reasons of safety, it is necessary that the safety barriers are for example kept lowered even if all of the train has already passed through the optical barrier. In other words, the value 1 of said signal corresponding to the presence of a train must be not only coded, but maintained for a certain safe period of time. This maintenance of an Input, or an Output, for a certain period of time at an initial value is currently performed by safety computers of the DIGISAFE type, i.e. by a coded safety processor executing software algorithms for processing said Inputs/Outputs.

Generally, the Inputs/Outputs to be taken into account by the coded safety processor are received in the form of successive incoming messages which can be successively subscripted, each incoming message comprising:

- a set of n Inputs/Outputs $es_i$ (i=1, ..., n), each characterized by a binary state which may be for example permissive (when said Input/Output is for example equal to 1) or restrictive (when said Input/Output is equal to 0);
- a checksum $\Sigma Ses_i$ made up of the arithmetical sum of a check code or signature $Ses_i$, which can be pre-determined, associated with the state of each Input/Output;
- and a date to date the checksum.

The $j^{th}$ incoming message can then be written in the following form:

$[\{es_i\}, (\Sigma Ses_i)+\text{Date}]_j$

From each incoming message, the coded safety processor generates an outgoing message such that the $j^{th}$ outgoing message, generated from the $j^{th}$ incoming message, comprises:

- a set of n Inputs/Outputs $esm_i$, each characterized by said binary state, each Input/Output $esm_i$ being calculated from the Input/Output $es_i$ as a function of a possible maintenance of the state of said Input/Output $es_i$ for a period Ti;
- a checksum $\Sigma Sesm_i$ made up of the arithmetical sum of a check code or signature $Sesm_i$ determined by said coded safety processor as a function of the signatures $Ses_i$ of the Inputs/Outputs of the $j^{th}$ incoming message and a possible maintenance of one of the Inputs/Outputs $es_i$ of the $j^{th}$ incoming message;
- and said date.

Said date is a date which is incremented by a value which is constant to each incoming message and then makes it possible to verify that the $j^{th}$ outgoing message and the $(j-1)^{th}$ outgoing message are the result of processing of two consecutive incoming messages. Also, the period of maintenance $T_i$ of an Input/Output $es_i$ of an incoming message represents a maintenance time of said Input/Output $es_i$ at one of its states for a predefined number of successive messages.

The $j^{th}$ outgoing message can then be written in the following form:

$[\{esm_i\}, (\Sigma Sesm_i)+(\text{Date})]_j$

Unfortunately, each coded safety processor, on the one hand, comprises numerous costly electronic components but also, on the other hand, requires advanced software engineering, which is not economically advantageous.

BRIEF SUMMARY OF THE INVENTION

An object of the present invention is to propose a maintenance filtering method and device to maintain one or more Inputs/Outputs at a binary state free from any use and any execution of safety software, thus providing for a reduction in the costs associated with said maintenance of said Input/Output at an initial value.

With this object, a device and a method are proposed for maintenance filtering where checksums are calculated for the outgoing message by adding at least one compensation to the checksum, the compensation being calculated as a function of a current state of a pseudo-random generator and an item taken from a compensation table.

A set of sub-claims also presents advantages of the invention.

On the basis of a maintenance filtering method on a flow of m successive incoming messages $Es_j$, intended in particular to be received at the input to a maintenance filtering device intended to process them in order to generate at the output from each incoming message $Es_j$ an outgoing message $Esm_j$, subscript j denoting the successive incoming messages, each incoming message $Es_j$ comprising:

a. a set of n Inputs/Outputs $es_{i,j}$ (i=1, ..., n), n being a positive whole number, each of which can be characterized by $S_i$ states $P_{q,i}$, q running from 1 to $s_i$, $s_i$ being a positive whole number, in particular greater than or equal to 2, each state $P_{q,i}$ of an Input/Output $es_{i,j}$ being associated with a value $v_{q,i}$ to which said Input/Output $es_{i,j}$ is equal when it is in said state $P_{q,i}$, each state $P_{q,i}$ being able to be a state intended to be maintained (then notated $P_{q,i}(h)$) (in particular for a time period $T_i$) or a state intended not to be maintained, notated $P_{q,i}(f)$. In the rest of the document, in particular the state or states and the effective value or values of the Input/Output $es_{i,j}$ to the $j^{th}$ incoming message will be notated and $v_{q,i,j}$ respectively. In particular, if each incoming message is identical, each of said incoming messages then comprises the same number of Inputs/Outputs and the number of states capable of characterizing the same Input/Output in each of the incoming messages is a constant, i.e. $es_{i,j} \in \{es_i\} \forall j$, $P_{q,i,j} \in \{P_{q,i}\} \forall J$ and $v_{q,i,j} \in \{v_{q,i}\} \forall j$.

b. a checksum $\Sigma Ses_{i,j}$ of signatures $Ses_{i,j}$, in particular made up of an arithmetic sum of said signatures $Ses_{i,j}$, which can be pre-determined, each signature $Ses_{i,j}$ being in particular calculated as a function of the state of the Input/Output $es_{i,j}$ with which it is associated and being intended to code said Input/Output $es_{i,j}$;

c. and a date $d_i$ intended to date the checksum, said date being incremented by a date increment for each incoming message, said maintenance filtering method providing for the generation of an outgoing message $Esm_j$ from each incoming message $Es_j$, such that the $j^{th}$ outgoing message $Esm_j$ generated from the $j^{th}$ incoming message $Es_j$ comprises:

d. a set of n Inputs/Outputs $esm_{i,j}$, each of which can be characterized by said $s_i$ states $P_{q,i,j}$, each state $P_{q,i,j}$, of an Input/Output $esm_{i,j}$ being associated with said value to which said Input/Output $esm_{i,j}$ is equal when it is in said state $P_{q,i,j}$, the value $v'_{q,i,j}$ of the Input/Output $esm_{i,j}$ of the outgoing message $Esm_j$ being able to be equal to or different from the value $v_{q,i,j}$ of the Input/Output $es_{i,j}$ of the incoming message $Es_j$ as a function of possible maintenance of the state $P_{q,i}$ of the Input/Output $es_{i,j}$ or, in other words, possible maintenance of said value $V_{q,i}$ of said Input/Output $es_{i,j}$, for example for a period $T_i$ which can be expressed as a number of successive messages, starting with the generation of a $t^{th}$ outgoing message $Esm_t$, t<j, and preferably, capable of being prolonged from the $j^{th}$ incoming message by a new period greater than or equal to said period $T_i$ starting with the receipt of a $g^{th}$ incoming message characterized by t<g≤j for which the Input/Output $es_{i,g}$ is intended to be maintained. In particular, the value $v_{q,i,j}$ of the Input/Output $esm_{i,j}$ of the (j)$^{th}$ outgoing message is equal to the value $v_{q,i,t}$ of the Input/Output $es_{i,t}$ of the $t^{th}$ outgoing message whatever the state $P_{q,i,j}$ of the Input/Output $es_{i,j}$ of the (j)$^{th}$ incoming message if and only if there is a $t^{th}$ incoming message j−$T_i$≤t<j such that:

the state $P_{q,i,t}$ of the Input/Output $es_{i,t}$ of the $t^{th}$ incoming message $Es_t$ is a state intended to be maintained for a period $T_i$, and optionally, the Input/Output $es_{i,t}$ of the $t^{th}$ incoming message $Es_t$ is not being maintained, i.e. a period $T_i$ of maintenance of said Input/Output $es_i$ is completed for a $r^{th}$ outgoing message, r<t, and the state of the Input/Output $es_i$ of each incoming message between the $r^{th}$ incoming message and the $t^{th}$ incoming message was not intended to be maintained.

e. a checksum $\Sigma Sesm_{i,j}$ of signatures $Sesm_{i,j}$, in particular made up of the arithmetic sum of signatures $Sesm_{i,j}$, each signature $Sesm_{i,j}$ being intended to code the Input/Output $esm_{i,j}$ as a function of the state of the Input/Output $es_{i,j}$;

f. and said date $d_j$;

the maintenance filtering method according to the invention is characterized in that it comprises a calculation of each checksum $\Sigma Sesm_{i,j}$ of the outgoing message by adding, in particular by addition, of at least one compensation to said checksum $\Sigma Ses_{i,j}$, said compensation being calculated as a function of a current state of a pseudo-random generator and an item taken from a compensation table. Said compensation is, in other words, an added value, for example by addition, to said checksum, in particular to a field of said checksum, so that the checksum $\Sigma Sesm_{i,j}$ characterizing the outgoing message is coherent with the states of the Inputs/Outputs $esm_{i,j}$ of said outgoing message, in particular when one or more of said Inputs/Outputs $esm_{i,j}$ are characterized by at least one state to be maintained for said period $T_i$.

The present invention also proposes, on the basis of a maintenance filtering device intended to process a flow of m incoming messages $Es_j$ as mentioned above, i.e. each comprising:

$n_j$ Inputs/Outputs $es_{i,j}$, a checksum $\Sigma Ses_{i,j}$ of signatures $Ses_{i,j}$, each signature $Ses_{i,j}$ being intended to code said Input/Output $es_{i,j}$, and a date $d_j$, in order to generate from each incoming message $Es_j$ an outgoing message $Esm_j$ comprising, as already mentioned above:

$n_j$ Inputs/Outputs $esm_{i,j}$, a checksum $\Sigma Sesm_{i,j}$ of signatures $Sesm_{i,j}$, each signature $Sesm_{i,j}$ being intended to code said Input/Output $esm_{i,j}$, and a date $d_j$, a maintenance filtering device characterized in that it is capable of maintaining at least one state of at least one Input/Output $es_{i,j}$ of at least one of said incoming messages $Es_j$ for a period of time $T_i$ whatever the state of an Input/Output of an incoming message consecutive to said incoming message $Es_j$ by generating at least one outgoing message characterized in that the state of the $i^{th}$ Input/Output of the outgoing message is equal to the state of the Input/Output $es_{i,j}$ of the incoming message $Es_j$, the maintenance filtering device according to the invention also being characterized in that it comprises:

a calculation device capable of calculating for each incoming message $Es_j$ from said checksum $\Sigma Ses_{i,j}$ and by adding, in particular by addition using at least one adder, at least one compensation to said checksum $\Sigma Ses_{i,j}$, a checksum $\Sigma Sesm_{i,j}$ intended to characterize the outgoing message $Esm_j$;

at least one pseudo-random generator with a current state intended to calculate said compensation, said pseudo-random generator being for example of the LFSR (Linear Feedback Shift Register) type;

at least one compensation table intended to calculate said compensation.

In particular, said calculation device, each pseudo-random generator and each compensation table are advantageously coupled with one another in order to generate said compensation, which can be calculated for example as a function of the current state of at least one pseudo-random generator and an item taken from at least one compensation table. Preferably, the maintenance filtering device comprises a date extraction device which can be coupled to said pseudo-random generator, and its calculation device comprises preferably at least one hardwired algorithm providing for the calculation of said compensation. In other words, a hardwired logic enables in particular the maintenance filtering device to maintain one or more Inputs/Outputs in at least one of their states. Thus, the maintenance filtering method according to the invention is in particular characterized by coupling of said pseudo-random generator with a date extraction device capable of extracting at least one signature of a checksum.

Preferably, the maintenance filtering method according to the invention is characterized by splitting of said checksum $\Sigma Sesm_{i,j}$ into c fields, c being greater than or equal to 2. Advantageously, the maintenance filtering device according to the invention is capable of splitting said checksum in order to separate it into said c fields.

Preferably, the method according to the invention is characterized by an initialization of at least one pseudo-random generator prior to receipt of a first incoming message $Es_1$, in particular by an LSFR initialization cycle, said initialization being intended to generate by means of said pseudo-random generator an initialization value capable of processing solely at least one state of an Input/Output intended not to be maintained. The LSFR initialization cycle of said pseudo-random generator is in particular characterized by a period of time enabling said generator to develop into a large number of states or, in other words, to generate a sufficient number of values before processing a first incoming message in order to enable a device downstream of said maintenance filtering device to detect an operating fault.

Preferably, from the first incoming message $Es_1$ and for each consecutive incoming message $Es_j$, the maintenance filtering method according to the invention comprises, on the one hand, a short LSFR cycle run by said pseudo-random generator associated with said Input/Output $es_{i,j}$ if the Input/Output $es_{i,j}$ is in a state intended not to be maintained and, on the other hand, a long LSFR cycle run by said pseudo-random generator associated with said Input/Output $es_{i,j}$ if the Input/Output $es_{i,j}$ is in a state intended to be maintained. In particular, said run of said short LSFR cycle and said run of said long LSFR cycle each comprise an addition carried out successively for each field of the checksum $\Sigma Ses_{i,j}$, of said field of the checksum $\Sigma Ses_{i,j}$ to, on the one hand, a value characterizing the current state of said pseudo-random generator and to, on the other hand, said item originating from said compensation table.

Preferably, the compensation table is capable of storing in a memory said predetermined data, each item originating from said compensation table being in particular pre-defined as a function of the Input/Output $es_{i,j}$, its state and the check signature $Ses_{i,j}$ in order to provide for either a generation of a check signature $Sesm_{i,j}$ characterizing a maintenance of the state of an Input/Output for a period $T_j$, or a generation of a check signature $Sesm_{i,j}$ characterizing a confirmation of the state of an Input/Output of an incoming message.

In particular, the maintenance filtering device according to the invention is characterized in that it comprises a date extraction device capable of extracting the date of at least one checksum, an incoming message or an outgoing message, and of determining a date increment between two successive messages processed by said maintenance filtering device. Thus, a systematic verification of the date increment between two consecutive incoming (or outgoing) messages advantageously makes it possible to guarantee the safety of said device, ensuring in particular that all the messages are properly processed.

The invention is now going to be described in more detail by referring to a preferred embodiment cited as a non-restrictive example. According to said preferred embodiment of the present invention, the maintenance filtering method may comprise the following stages consecutive to the stage f) described above in order to implement said compensation and said maintenance of a state of an Input/Output:

g. before receipt of a first incoming message $Es_1$:
   an initialization of at least one pseudo-random generator of said maintenance filtering device intended to provide for an initial generation of an initialization value. In particular, the number of pseudo-random generators of the maintenance filtering device according to the invention is equal at least to the number of Inputs/Outputs per incoming message intended to be maintained and said initialization is in particular characterized by an LSFR initialization cycle enabling a downstream device to detect an operating error;
   said initial generation, first initialized by each pseudo-random generator, of said initialization value. Said initialization value is in particular solely intended for processing (i.e. compensation) of a first field C1 of a checksum $\Sigma Ses_{i,j}$ of an incoming message $Es_j$ for which at least one of its Inputs/Outputs $es_{i,j}$ is characterized by a state intended to be maintained by said pseudo-random generator. Said initialization value is in particular combined with a compensation item solely able to compensate the states $P_{q,i,j}(f)$ of the Input/Output $es_{i,j}$ not intended to be maintained. In fact, each initialization value resulting from the initialization of each pseudo-random generator is in particular able to characterize a state of initialization of said pseudo-random generator. When said pseudo-random generator is in said state of initialization, the filtering device according to the invention is solely capable of compensating each state $P_{q,i,j}(f)$ intended not to be maintained, i.e. different from a state $P_{q,i,j}(h)$ or, in other words, different from a state intended to be maintained, and therefore makes it possible solely to confirm at least one value $v_{q,i,j}$ of an Input/Output $es_{i,j}$ associated with the state $P_{q,i,j}(f)$. Thus, said initialization value makes it possible solely to process at least one state $P_{q,i,j}(f)$ or, in other words, said initialization value makes it possible to calculate a checksum $\Sigma Sesm_{i,j}$ solely from an Input/Output $es_{i,j}$ whose state $P_{q,i,j}$ is a state intended not to be maintained;

h. from the first incoming message $Es_1$ and for each consecutive incoming message $Es_j$:
   splitting of the checksum $\Sigma Ses_{i,j}$ into c fields C1, ..., Cc;
   then for each Input/Output $es_{i,j}$ of the incoming message $Es_j$ comprising a state $P_{q,i,j}(h)$ intended to be maintained by means of said pseudo-random generator, each pseudo-random generator being in particular responsible, per incoming message, for the processing of the checksum $\Sigma Ses_{i,j}$ for one and only one Input/Output $es_{i,j}$ comprising, among the states $P_{q,i,j}$, capable of characterizing it, at least one state $P_{q,i,j}(h)$:
   if the Input/Output $es_{i,j}$ is in a state $P_{q,i,j}(f)$, i.e. not intended to be maintained or, in other words, requiring solely a confirmation of said state, the maintenance filtering method comprises the following stages characterizing in particular a short LSFR cycle run by a pseudo-random generator associated with said Input/Output $es_{i,j}$:

1. an addition of the first field $\Sigma Ses_{i,j}.C1$ of the checksum $\Sigma Ses_{i,j}$ to said initialization value and to an item $Data_{C1,q,i,j}$ originating from a compensation table, each item $Data_{C1,q,i,j}$ being in particular pre-defined as a function of the current state of the pseudo-random generator, the Input/Output $es_{i,j}$, its state $P_{q,i,j}$, and the check signature $Ses_{i,j}$ associated with said state $P_{q,i,j}(f)$ in order to provide in this case for a generation, at the output from said maintenance filtering device, of a check signature $Sesm_{i,j}$ characterizing a state $P_{q,i,j}$ of the Input/Output $esm_{i,j}$ equal to the state $P_{q,i,j}(f)$ of the Input/Output $es_{i,j}$;
2. a generation, by said pseudo-random generator, of a value characterizing a new state of said pseudo-random generator, then an addition of said value characterizing the new state to said second field $\Sigma Ses_{i,j}.C2$ of the checksum $\Sigma Ses_{i,j}$ and to an item $Data_{C2,q,i,j}$ originating from said compensation table, each item being $Data_{C2,q,i,j}$ in particular pre-defined as a function of the current state of the pseudo-random generator, the Input/Output $es_{i,j}$, its state $P_{q,i,j}$ and the check signature $Ses_{i,j}$ associated with said state $P_{q,i,j}(f)$ in order to provide in this case for a generation, at the output from said maintenance filtering device, of a check signature $Sesm_{i,j}$ characterizing a state $P_{q,i,j}$ of the Input/Output $esm_{i,j}$ equal to the state $P_{q,i,j}(f)$ of the Input/Output $es_{i,j}$;
3. a reiteration by said pseudo-random generator of stage 2) for each field C3 to Cc of the checksum $\Sigma Ses_{i,j}$ if the latter has been split into more than two fields;
4. after processing each field of the checksum $\Sigma Ses_{i,j}$, said pseudo-random generator generates a test value characterizing a state Test Dckd of said pseudo-random generator for said Input/Output $es_{i,j}$, said state Test Dckd being intended to provide for an extraction and verification of said date increment of the checksum obtained after processing all its fields;
5. an addition of a loop item $CompLFSR_{q,i,j}$ to a value characterizing the current state of the pseudo-random generator, i.e. the state Test Dckd of said pseudo-random generator in the stage preceding stage 5), each loop item $CompLFSR_{q,i,j}$ originating in particular from said compensation table and being predefined as a function of the state $P_{q,i,j+1}$ of the Input/Output $es_{i,j+1}$, and intended to provide for a return of said generator to its initialization value characterizing its state of initialization;
6. said generation of the outgoing message $Esm_j$;

if the Input/Output $es_{i,j}$ is in a state $P_{q,i,j}(h)$, i.e. a state intended to be maintained in particular for said period $T_i$, the maintenance filtering method comprises the following stages characterizing in particular a long LSFR cycle run by a pseudo-random generator associated with said Input/Output $es_{i,j}$:

1. a generation, by said pseudo-random generator, of an initial compensation value characterizing an initial state of compensation of said pseudo-random generator, said initial compensation value being intended solely to compensate the field C1 of the checksum $\Sigma Ses_{i,j}$ in order to produce a new checksum $\Sigma Sems_{i,j}$ for which the state of the Input/Output $ems_{i,j}$ is equal to the state of the Input/Output $es_{i,j}$, i.e. by maintaining said state $P_{q,i,j}$ of said Input/Output $es_{i,j}$, said initial compensation value being obtained by addition of an initial compensation item to said initialization value;
2. a compensation of the field C1 of the checksum $\Sigma Ses_{i,j}$ by addition of said field C1 to said initial compensation value and to an item $Data_{C1,q,i,j}$ originating from a compensation table, each item $Data_{C1,q,i,j}$ being in particular pre-defined as a function of the current state of the pseudo-random generator, the Input/Output $es_{i,j}$, its state and the check signature $Ses_{i,j}$ associated with said state $P_{q,i,j}(h)$ in order to provide in this case for a generation, at the output from said maintenance filtering device, of a check signature $Sesm_{i,j}$ characterizing a state $P_{q,i,j}$ of the Input/Output $esm_{i,j}$ equal to the state $P_{q,i,j}(h)$ of the Input/Output $es_{i,j}$;
3. a generation, by said pseudo-random generator, of a value characterizing a new state of said pseudo-random generator, then an addition of said value characterizing the new state to said second field C2 of the checksum $\Sigma Ses_{i,j}$ and an item $Data_{C2,q,i,j}$ originating from said compensation table, each item $Data_{C2,q,i,j}$ being in particular pre-defined as a function of the current state of the pseudo-random generator, the Input/Output $es_{i,j}$, its state and the check signature $Ses_{i,j}$ associated with said state $P_{q,i,j}(h)$ in order to provide in this case for a generation, at the output from said maintenance filtering device, of a check signature $Sesm_{i,j}$ characterizing a state $P_{q,i,j}$ of the Input/Output $esm_{i,j}$ equal to the state $P_{q,i,j}(h)$ of the Input/Output $es_{i,j}$;
4. a reiteration by said pseudo-random generator of stage 3) for each field C3 to Cc of the checksum $\Sigma Ses_{i,j}$ if the latter has been split into more than two fields;
5. after processing each field of the checksum $\Sigma Ses_{i,j}$, said pseudo-random generator generates a test value characterizing a state Test Dckd of said pseudo-random generator for said Input/Output $es_{i,j}$, said state Test Dckd being intended to provide for an extraction and verification of said date increment of the checksum obtained after processing all its fields;
6. said generation of the outgoing message $Esm_j$;
7. then for each incoming message $Es_w$ consecutive to said incoming message $Es_j$ and separated from said incoming message $Es_j$ by a period of time shorter than or equal to the period $T_i$ of maintenance of the state of said Input/Output $es_{i,j}$:
   i. a generation, by said pseudo-random generator, of a value characterizing a new state of said pseudo-random generator, then an addition of said value characterizing the new state to said first field C1 of the checksum $\Sigma Ses_{i,w}$ and an item $Data_{C1,q,i,w}$ originating from said compensation table, each item $Data_{C1,q,i,w}$ being in particular pre-defined as a function of the current state of the pseudo-random generator, the Input/Output $es_{i,w}$, its state $P_{q,i,w}$ and the check signature $Ses_{i,w}$ associated with said state $P_{q,i,j}(h)$ in order to provide in this case for a generation, at the output from said maintenance filtering device, of a check signature $Sesm_{i,w}$ characterizing a state $P_{q,i,j}$ of the Input/Output $esm_{i,w}$ equal to the state $P_{q,i,j}(h)$ of the Input/Output $es_{i,j}$, followed by a repetition of stages 3) to 6) for said incoming message $Es_w$, i.e.

ii. a generation, by said pseudo-random generator, of a value characterizing a new state of said pseudo-random generator, then an addition of said value characterizing the new state to said second field C2 of the checksum $\Sigma Ses_{i,w}$ and an item $Data_{C2,q,i,w}$ originating from said compensation table, each item $Data_{C2,q,i,w}$ being in particular pre-defined as a function of the current state of the pseudo-random generator, the Input/Output $es_{i,w}$ its state $P_{q,i,w}$ and the check signature $Ses_{i,w}$ associated with said state $P_{q,i,j}(h)$ in order to provide in this case for a generation, at the output from said maintenance filtering device, of a check signature $Sesm_{i,w}$ characterizing a state $P_{q,i,j}$ of the Input/Output $esm_{i,w}$ equal to the state $P_{q,i,j}(h)$ of the Input/Output $es_{i,j}$;

iii. a reiteration by said pseudo-random generator of stage 3) for each field C3 to Cc of the checksum $\Sigma Ses_{i,w}$ if the latter has been split into more than two fields;

iv. after processing each field of the checksum $\Sigma Ses_{i,w}$ said pseudo-random generator generates a test value characterizing a state Test Dckd of said pseudo-random generator for said Input/Output $es_{i,w}$, said state Test Dckd being intended to provide for an extraction and verification of said date increment of the checksum obtained after processing all its fields;

v. said generation of the outgoing message $Esm_w$;

8. an addition of a loop item $CompLFSRQ_{q,i,w}$ to a value characterizing the state of the pseudo-random generator in the stage preceding stage 8), i.e. the state Test Dckd or, in other words, said value characterizing the current state of the pseudo-random generator, said loop item $CompLFSRQ_{q,i,w}$ being intended to provide for a return of said generator either to its initialization value characterizing its state of initialization if the Input/Output $es_{w+1}$ of the incoming message $Es_{w+1}$ is characterized by a state $P_{q,i,w+1}(f)$, or to its initial compensation value if the Input/Output $es_{w+1}$ of the incoming message $Es_{w+1}$ is characterized by a state $P_{q,i,w+1}(h)$, $Es_{w+1}$ being the first incoming message arriving at the input to said maintenance filtering device and separated from said incoming message $Es_j$ by a period of time strictly longer than the period $T_i$, said loop item $CompLFSRQ_{q,i,w}$ originating in particular from said compensation table and being thus predefined as a function of the state $P_{q,i,j}$ of the Input/Output $es_{i,w+1}$;

9. a return to stage h) in order to process the incoming message $es_{i,w+1}$ and the next incoming messages consecutive to $es_{i,w+1}$.

BRIEF DESCRIPTION OF THE SEVERAL VIEWS OF THE DRAWING

Finally, exemplary embodiments and applications are provided using the following figures:

FIG. 1 example of maintenance filtering intended to maintain the state of an Input/Output for a period $T_i$.

FIG. 2 exemplary embodiment of a maintenance filtering device according to the invention.

DESCRIPTION OF THE INVENTION

Figure 3:
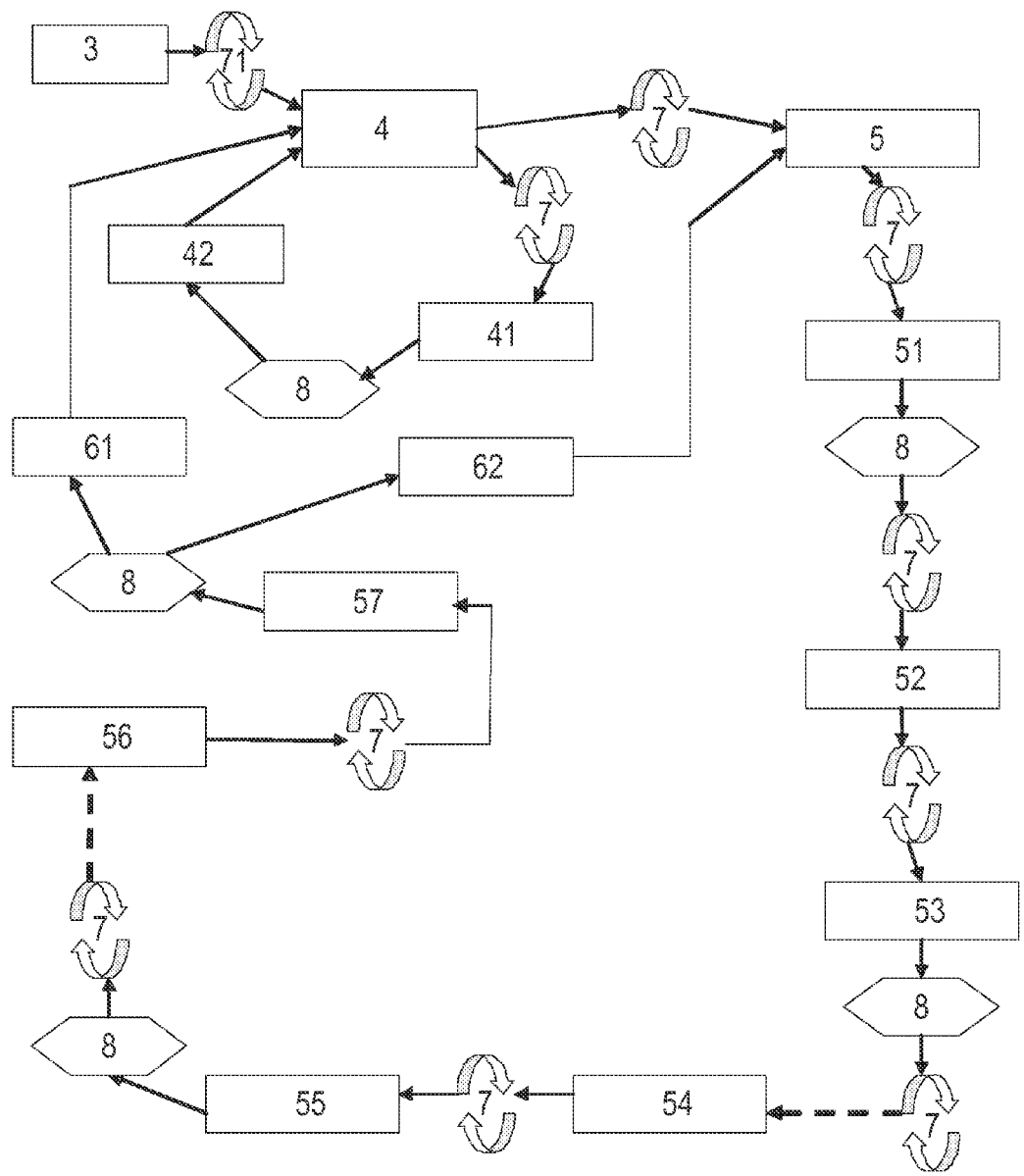
FIG. 3 example of a maintenance of an Input/Output in one of its states by means of a maintenance filtering device according to the invention.

As an example, FIG. 1 shows an example of maintenance filtering intended to maintain the state $P_{2,2,j}$ of the $2^{nd}$ Input/Output $es_{2,j}$ of an incoming message $Es_j$, said Input/Output being able to be characterized by two states $P_{q,2,j}$ ($s_2=2$): $P_{1,2,j}$ and $P_{2,2,j}$. Graph 11 represents the state $P_{q,2,j}$ (y-axis) of the Inputs/Outputs $es_{2,j}$ (x-axis) of consecutive incoming messages $Es_j$ (j=1, ..., 14) received by the maintenance filtering device according to the invention. Graph 12 represents the state $P_{q,2,j}$ (x-axis) of the Inputs/Outputs $esm_{2,j}$ (y-axis) of consecutive outgoing messages $Esm_j$ (j=1, ..., 14) generated by the maintenance filtering device according to the invention after processing of the incoming messages $Es_j$ and provided at the output from said maintenance filtering device. When the Input/Output $es_{2,j}$ of an incoming message $Es_j$ is in said state $P_{2,2,j}$, then this state is maintained for an interval of time or period $T_i$ and, for this period $T_i$, each Input/Output $esm_{2,j}$ has the same state as $es_{2,j}$ whatever j.

FIG. 2 describes an exemplary embodiment of a maintenance filtering device 2 according to the invention. Let i be a positive whole number, with i running from 1 to n, and let us consider a $j^{th}$ incoming message 11 comprising n binary Inputs/Outputs $es_{i,j}$, i.e. $s_i=2$ whatever i and whatever j, i.e. $P_{q,i,j}$ is either equal to $P_{1,i,j}=P_1$ or equal to $P_{2,i,j}=P_2$, each of said Inputs/Outputs $es_{i,j}$ thus being characterized by a state or a binary value, for example a restrictive state $P_2$ which can be associated with a value 0 to which said Input/Output $es_{i,j}$ may be equal and a permissive state $P_1$ which may be associated with a value 1 to which said Input/Output $es_{i,j}$ may be equal, said n Inputs/Outputs $es_{i,j}$ also being coded with a checksum $\Sigma Ses_{i,j}$ split into two fields, respectively a first field $(\Sigma Ses_{i,j}).C1$ and a second field $(\Sigma Ses_{i,j}).C2$, said coding being for example performed by a coded safety processor upstream of the maintenance filtering device 2 according to the invention. The checksum $\Sigma Ses_{i,j}$ is in particular made up of an arithmetic sum of initial codes or signatures $Ses_{i,j}$ which can be pre-determined, each initial signature $Ses_{i,j}$ being associated with the state of an Input/Output $es_{i,j}$ of the incoming message 11 and intended to code it. Said incoming message 11 can then be written as follows:

[$\{es_{i,j}\}$, $(\Sigma Ses_{i,j}).C1$, $(\Sigma Ses_{i,j}).C2$]+$d_j$ where subscript j can be used to identify the $j^{th}$ sample of incoming message 11 received by the maintenance filtering device 2, j running for example from 1 to m, m being a positive whole number. $d_j$ is a parameter which can be used to date said sample j, said parameter $d_j$ being for example incremented for each sample received by the maintenance filtering device 2. Said first field according to the invention, respectively the second field (or generally the $c^{th}$ field when the checksum is split into c fields), is made up for each sample j of the sum modulo A1, respectively A2 (or respectively Ac), of the signatures belonging to said first field $Ses_{i,j}.C1$, respectively signatures belonging to said second field $Ses_{i,j}.C2$ (or respectively signatures belonging to the $c^{th}$ field $Ses_{i,j}.Cc$), corresponding to the states of the inputs $es_{i,j}$ for said sample j added to the date $d_j.C1$ of said sample j, respectively $D_j.C2$ (or respectively $D_j.Cc$). Each field according to the invention, identified above by C1, respectively by C2 (or respectively Cc), represents a non-separable sum of items of information, i.e. it is not possible to extract a signature $Ses_{i,j}$, nor a date $d_j$ from said field. For example, A1 and A2 (until respectively Ac when the checksum is split into c fields) are prime numbers between $2^{23}$ and $2^{24}$ and, in particular, each of the fields of the sample j, $(\Sigma Ses_{i,j}).C1+d_j.C1$, $(\Sigma Ses_{i,j}).C2+d_i.C2$, (until respectively $(\Sigma Ses_{i,j}).Cc+d_j.Cc$), may comprise 24 bits in order to facilitate calculations by a 32-bit processor placed downstream of the maintenance filtering device 2. Thus, an incoming message comprising a set of binary Inputs/Outputs $es_{i,j}$ and c segments of its checksum comprises c+1 groups or packets of indissociable or, in other words, non-separable information.

A flow of m samples of incoming messages 11 each comprising said n binary Inputs/Outputs may then be represented by m successive sets $Es_j = \{es_{1,j}, \ldots, es_{n,j}\}$ comprising said n Inputs/Outputs coded by said checksum split according to the first and the second field: $(Ses_{1,j}+ \ldots + Ses_{n,j}).C1+D_j.C1$ and $(Ses_{1,j}+ \ldots + Ses_{n,j}).C2+D_j.C2$.

The state of each Input/Output $es_i$ is thus protected by a check signature $Ses_i$ integrated into the checksum presented above. The check signature $Ses_i$ according to the invention is in particular a value between 1 and A, selected randomly by a device upstream of the filtering device, for example calculated by a pseudo-random generator or produced according to a predefined law of mathematical calculation. A value is selected for the two fields C1 and C2 of the check signature and for each of the possible states of the Input/Output $es_i$.

For example, for an Input/Output $es_i$ characterized by a restrictive state $es_i=0$ and a permissive state $es_i=1$, we have:
$es_i=1$: $Ses_i.C1=SESiTrue.C1$ $Ses_i.C2=SESiTrue.C2$
$es_i=0$: $Ses_i.C1=SESiFalse.C1$ $Ses_i.C2=SESiFalse.C2$ The successive values of the check signatures $Ses_i$ of the Input/Output i of a flow of incoming message are in particular denoted $Ses_{i,j}$ for the $j^{th}$ incoming message. The procedure is analogous for the outgoing message.

After maintaining the Input/Output $es_{i,j}$ in one of its binary states or, in other words, after maintaining the Input/Output $es_{i,j}$ at one of its values 1 or 0, the checksum processed by the maintenance filtering device 2 has changed and comprises a sum of final signatures $Sesm_{i,j}$ intended to protect the outgoing message 12. Each of the fields of the checksum may then be written as follows, by taking up the preceding example:
$esm_i=1$: $Sesm_i.C1=SESMiTrue.C1$
$Sesm_i.C2=SESMiTrue.C2$
$esm_i=0$: $Sesm_i.C1=SESMiFalse.C1$
$Sesm_i.C2=SESMiFalse.C2$ In particular, for each Input/Output not maintained, the protection signature $Sesm_i$ obtained after maintenance is selected so as to be equal to the initial protection signature $Ses_i$ of the Input/Output of the incoming message: $SESi^*=SESMi^*$, i.e. $SESiTrue.C1=SESMiTrue.C1$; $SESiTrue.C2=SESMiTrue.C2$; $SESiFalse.C1=SESMiFalse.C1$; $SESiFalse.C2=SESMiFalse.C2$.

Preferably, for each maintained Input/Output of the sample j, the final signature $Sesm_i$ intended for protection and obtained after maintenance is selected randomly and is different from the initial protection signature $Ses_i$ of the Input/Output of the incoming message 11: $SESi^* \neq SESMi^*$, i.e. $SESiTrue.C1 \neq SESMiTrue.C1$; $SESiTrue.C2 \neq SESMiTrue.C2$; $SESiFalse.C1 \neq SESMiFalse.C1$; $SESiFalse.C2 \neq SESMiFalse.C2$. This makes it possible in particular to guarantee effective processing of the Inputs/Outputs by the maintenance filtering device 2 according to the invention.

During maintenance of a value or a state of an Input/Output of a sample j, a compensation originating from a compensation table 24 is added, for example by means of at least one adder 212 of the calculation device 21, to the checksum, for example a first compensation to the first field of the checksum, and a second compensation to the second field of the checksum, in order to produce a checksum comprising a new signature for each Input/Output maintained. This compensation may for example be calculated from the state of a pseudo-random generator 23 and a pre-calculated item of data stored in the compensation table 24.

Thus, the maintenance filtering device 2 is capable of generating from said flow of m samples of incoming messages comprising n binary Inputs/Outputs a flow of m samples of outgoing messages 12 each comprising n binary Inputs/Outputs, said flow of outgoing messages being able to be represented by m successive sets $Esm_j=\{esm_{1,j}, \ldots, esm_{n,j}\}$ each comprising said n Inputs/Outputs $esm_{i,j}$ coded by a checksum calculated by said maintenance filtering device in order to take account of each Input/Output, the state of which has been maintained in said outgoing message 12.

The operation of the pseudo-random generator 23 and the content of the compensation table 24 are in particular capable of guaranteeing that only the data needed to implement the maintenance of the Input/Output intended to be maintained are available.

Preferably, for each sample received by the maintenance filtering device 2, the dated checksums are compensated by the addition of a current state of the pseudo-random generator and a compensation taken from the compensation table. The selection of data from the compensation table 24, as well as the changes in the pseudo-random generator 23 depend in particular on the functional value of the Input/Output to be maintained.

The pseudo-random generator 23, for example of the LFSR (Linear Feedback Shift Register)/accumulator type, may thus be advantageously used in order temporally to protect the state of an Input/Output of said incoming message 11 for a predetermined period $T_i$. In particular, each Input/Output of an incoming message 11 intended to be maintained can in particular be associated with a pseudo-random generator 23, in particular one and only one pseudo-random generator 23, intended to calculate the maintenance or non-maintenance of said Input/Output. Each pseudo-random generator 23 is in particular capable of running through two LFSR check cycles, each defining a mode of change of said pseudo-random generator 23: a short LFSR cycle associated with a non-maintained Input/Output value and a short LFSR change mode and a long LFSR cycle associated with the maintenance of an Input/Output value and a long LFSR change mode of said pseudo-random generator 23. Thus, the maintenance filtering device 2 comprises in particular at least two functions: a maintenance function intended to maintain the state of an Input/Output of an incoming message 11 associated with the long LSFR mode, and a non-maintenance or changing function intended not to maintain the state of an Input/Output of an incoming message 11, associated with the short LFSR mode.

Preferably, each pseudo-random generator 23 comprises a function to predetermine Inputs/Outputs allowing said generator to select, as a function of the incoming message 11, a unique Input/Output of said incoming message, the state of which is to be maintained. Said unique Input/Output of said incoming message intended to be processed by said pseudo-random generator 23 is described in the rest of this document as a "predetermined" Input/Output. The selection made by said pseudo-random generator 23 depends on the incoming message 11, for example on an incoming message 11 type. Thus, said maintenance filtering device according to the invention is capable of predefining or predetermining for each incoming message 11, at least one "predetermined" Input/

Output to be processed by one and only one pseudo-random generator and the state of which is to be maintained by said maintenance filtering device 2, each "predetermined" Input/Output being said unique Input/Output of said incoming message processed by said pseudo-random generator.

In other words, one and only one Input/Output $es_{i,j}$ per incoming message, i.e. said "predetermined" Input/Output, can thus preferably be processed by said pseudo-random generator. In order to process several Inputs/Outputs of an incoming message, several pseudo-random generators in parallel or in series can in particular be used in order that each one processes a different Input/Output of said incoming message.

Preferably, the calculation device 21 also comprises a module 211 intended to calculate the Inputs/Outputs $esm_{i,j}$ of the outgoing message 12 from the Inputs/Outputs $es_{i,j}$ of the incoming message 11, said module 211 being capable of calculating said Inputs/Outputs $esm_{i,j}$ of the outgoing message 12 as a function of a state of the Inputs/Outputs $es_{i,j}$ of the incoming message 11. In particular, said module 211 comprises a command table capable of describing each Input/Output $es_{i,j}$ to be maintained and a finite-state(s) machine capable of tracking the state of each pseudo-random generator and calculating each state of each Input/Output $esm_{i,j}$ from the states of each Input/Output $es_{i,j}$ and a content of said command table. Preferably, the maintenance filtering device 2 comprises a signature extraction device 22 which can be coupled to said pseudo-random generator 23 and to the calculation device 21 and is capable of extracting from a checksum of an outgoing message a date increment or a date in order to verify that each incoming message 11 is processed by the maintenance filtering device 2.

We are now going to describe using FIG. 3 the successive stages of processing of an incoming message received by the maintenance filtering device according to the invention, for example in the case of maintenance of an Input/Output of said incoming message in its restrictive state: $es_{i,j}=0$, by taking up the characteristics of the incoming message and the outgoing message as given for FIG. 2.

First of all, the pseudo-random generator is initialized 3, and changed in particular according to an LSFR initialization cycle 71 intended to bring said pseudo-random generator to an initial state 4 characterized by an initial value Comp_a_1.C1 intended to compensate a permissive state. Its initialization 3 may for example be correlated with a re-initialization of a device capable of generating Inputs/Outputs intended to be processed by said maintenance filtering device, or with a re-initialization triggered by a detection of an operating error. The LSFR initialization cycle enables said pseudo-random generator to change into a large number of states in a period the duration of which can be adjusted as a function of a time needed for detection of the operating error by a downstream device.

In this initial state 4, the maintenance function of the maintenance filtering device according to the invention comprises solely a compensation enabling the pseudo-random generator to confirm and calculate a permissive state of the Input/Output. In its initial state 4, the pseudo-random generator cannot therefore calculate a restrictive state of a "predetermined" Input/Output which it is intended to process and the state of which is restrictive at the input to the maintenance filtering device, but can solely process a "predetermined" Input/Output, the state of which is permissive at the input to the maintenance filtering device.

If the state of the "predetermined" Input/Output of an incoming message is permissive (i.e. $es_{i,j}=1$) at the input to said maintenance filtering device, the change function of said generator is used by the latter: the field C1 of the checksum intended to code the Inputs/Outputs of the incoming message (i.e. $\Sigma Ses_{i,j}.C1$) is compensated, i.e. said maintenance filtering device is capable of adding, for example using an adder, to the field C1 of the checksum, said initial value Comp_a_1.C1 characterizing said initial state 4 along with an item of data selected from the compensation table, then the generator changes in short LFSR mode 7 towards a state 41 characterized by a value Comp_a_1.C2 providing for compensation of the field C2 of the checksum intended to code the incoming message. This advantageously makes it possible to avoid blocking of the pseudo-random generator on a compensation state. The selection of said item of data from the compensation table depends in particular on the state of the "predetermined" Input/Output of the incoming message and the LFSR check cycle of the pseudo-random generator.

Each Input/Output of said incoming message is capable of being a "predetermined" Input/Output for one of the pseudo-random generators of said maintenance filtering device. Thus, once each "predetermined" Input/Output of said incoming message has been processed by the pseudo-random generator selecting it, for example by several pseudo-random generators of the LFSR type operating in parallel or in series and each having simultaneously selected their "predetermined" Input/Output of said incoming message, the validity of the checksum obtained after processing all the Inputs/Outputs of the message intended to be maintained is verified by said maintenance filtering device, in particular by subtracting the signature of each Input/Output from the checksum in order to extract the date. Advantageously, extraction and verification 8 of the date makes it possible in particular to guarantee that each sample of incoming message is processed by said maintenance filtering device and is associated with an outgoing message. For this purpose, a "Test Dckd" state of said pseudo-random generator preferably makes it possible to perform a differential verification of the date.

Thus, at each cycle of acquisition of an incoming message intended to be processed by the maintenance filtering device, the date of said incoming message is verified by comparison with the date of the preceding incoming message which has been processed, i.e. the outgoing message, in order to guarantee that each incoming message is taken into account, which advantageously makes it possible to protect the maintenance filtering device. After verification, and in the event of validity of the checksum, a first item of loop data 42 is associated with the state of the pseudo-random generator in order to allow said generator to return to its initial state 4 making it possible to compensate and Input/Output with a permissive state. The first loop item 42 is in particular characterized by compensation value CompLFSR1 intended to compensate the field C1 of a permissive Input/Output of an incoming message consecutive to the message processed previously. In the event of error, the checksum is definitively altered and the messages produced by said maintenance filtering device can no longer be used by devices downstream of said maintenance filtering device. Preferably, the maintenance filtering device can be automatically re-initialized in the event of detection of an operating error by a monitoring device and said re-initialization allows the pseudo-random generator to return to its initial state 4 by means of a change according to said LSFR initialization cycle 71. The change according to said LSFR initialization cycle 71 guarantees a minimum time of unavailability of the maintenance filtering device in order to guarantee that any fault is detected by the downstream devices.

If the state of the Input/Output of the incoming message is restrictive (i.e. $es_{i,j}=0$) at the input to said maintenance filtering device, the pseudo-random generator is in particular capable of changing according to an LSFR cycle 7 towards an initial compensation state 5 of a restrictive Input/Output allowing for solely a compensation of the checksum towards a restrictive state of the Input/Output. In other words, said initial compensation state 5 is characterized by an initial value Comp_a_0_1.C1 making it possible, during compensation of the checksum of the incoming message when the state of the Input/Output of the incoming message is restrictive, to generate by compensation in particular of the field C1 of said checksum, a new checksum comprising a compensated field C1 and the field C2 and intended to maintain a restrictive state for said Input/Output. Said compensation comprises in particular an addition, in particular by addition, to the field C1 of the checksum, of said initial value Comp_a_0_1.C1 and an item of data selected from the compensation table, each intended to maintain the Input/Output in its restrictive state. Then said pseudo-random generator changes in LFSR mode 7 towards a state 51 characterized by a value Comp_a_0_1.C2 providing for a compensation of the field C2 of the checksum and intended to maintain the Input/Output in its restrictive state. After each compensation of the field C1 and the field C2 of the checksum, a date extraction device is in particular capable of verifying 8 a change in the date increment, in particular by extraction of the date from the checksum the fields of which have been compensated, then by verification of said date with respect to the date of an outgoing message and/or an incoming message preceding the message undergoing treatment by said maintenance filtering device. In all cases, after each compensation, the maintenance filtering device is capable of creating an outgoing message comprising a number of Inputs/Outputs $esm_{i,j}$ identical to the number of Inputs/Outputs of the incoming message, but characterized in that the state of each Input/Output, the state of which is intended to be maintained has been maintained, and the signature of which or more precisely the checksum associated with it has been updated in order to take account of the possible maintenance of one or more Inputs/Outputs of said incoming message.

After verification 8 of the date increment and maintenance of the Input/Output in its restrictive state on the basis of the compensation of the fields C1 and C2 of the checksum by means respectively of the initial value Comp_a_0_1.C1 of the initial state 5 and the value Comp_a_0_1.C2 of the state 51, the maintenance filtering device is capable of maintaining, for a period $T_i$ equal to the time needed to complete $T_i-1$ successive stages ($T_i$ being a period expressed in numbers of successive messages), the Input/Output in its restrictive state by completing successively at each stage t, t running from 2 to $T_i$:
  a generation by change in said pseudo-random generator according to an LSFR cycle 7 of a state 52, 54, 56 characterized by a compensation value Comp_a_0_t.C1;
  a compensation of the first field C1 of the checksum by adding to said checksum said value Comp_a_0_t.C1 and an item of data from the compensation table intended to compensate the first field C1 of the checksum in a solely restrictive state of said Input/Output;
  a generation by change in said pseudo-random generator according to an LSFR cycle 7 of a state 53, 55, 57 characterized by a compensation value Comp_a_0_t.C2;
  a compensation of the second field C2 of the checksum by adding to said checksum the value Comp_a_0_t.C2 and an item of data from the compensation table intended to compensate the second field C2 of the checksum in a solely restrictive state of said Input/Output;
  a verification 8 of the date increment, for example by extraction of said date from the checksum;
  a generation of an outgoing message.

The number ($T_i-1$) of successive stages determines the duration of maintenance of the Input/Output in its restrictive state and may be predetermined as a function of the incoming message, for example as a function of a type of incoming message.

After the $(T_i-1)^{th}$ stage (i.e. $t=T_i$), the maintenance filtering device is in particular capable of generating either a second item of loop data CompLFSR2 61 allowing the generator to return to the initial state 4 characterized by the initial value Comp_a_1.C1 intended to compensate a permissive state of an Input/Output of the next incoming message, or a third item of loop data CompLFSR3 62 allowing the generator to return to the initial compensation state 5 of a restrictive Input/Output. Preferably, the pseudo-random generator is capable of associating, in particular by addition, said second item of loop data CompLFSR2 61 with its state resulting from the $(T_i-1)^{th}$ stage and the verification 8 of date if the incoming message consecutive to the incoming message having been processed comprises an Input/Output characterized by a permissive state, or said third item of loop data CompLFSR3 62 if said incoming message consecutive to the incoming message having been processed comprises an Input/Output characterized by a restrictive state.

Thus, a compensation value, such as for example the initial value Comp_a_1.C1 characterizing the state initial, can be associated with each state of the pseudo-random generator and provides for compensation of the checksum, or in particular one of the fields of the checksum, while guaranteeing either the maintenance of an Input/Output of an incoming message, or non-maintenance of it, i.e. confirmation of it.

In order to trace the maintenance operation performed by the pseudo-random generator, the signatures of the Input/Output after maintenance of said Input/Output, i.e. in the outgoing message, are in particular different from the signatures of said Input/Output prior to maintenance of it, i.e. in the incoming message, at the input to the maintenance filtering device. On the other hand, the signatures associated with an incoming message with Inputs/Outputs not requiring any maintenance of their respective state are preferably identical to the signatures of the outgoing message.

An example of a list of compensations for a restrictive maintenance of the $i^{th}$ Input/Output of an incoming message is given below:

When a $j^{th}$ incoming message is received by the maintenance filtering device, its $i^{th}$ Input/Output $es_i$ is coded for example by a signature SESiTrue if its state is permissive, and respectively a signature SESiFalse if its state is restrictive. During maintenance of this $i^{th}$ Input/Output, the latter is converted by the maintenance filtering device into an $i^{th}$ Input/Output $esm_i$ of an outgoing message, said $i^{th}$ Input/Output $esm_i$ being coded by signature SESMiTrue if the state of $es_i$ was permissive, and respectively SESMiFalse if the state of $es_i$ was restrictive, each signature being predefined and selected randomly.

The item from the compensation table intended to compensate a checksum coding an Input/Output whose state at the input to said maintenance filtering device is permissive, and thus associated with the value Comp_a_1.C1 or respectively Comp_a_1.C2, is given for example by:
CompNMaintenanceR1_i.C1=
  SESMiTrue.C1−SESiTrue.C1−Comp_a_1.C1
and respectively
CompNMaintenanceR1_i.C2=
  SESMiTrue.C2−SESiTrue.C2−Comp_a_1.C2

The above mentioned item of compensation data advantageously prevents any compensation towards a restrictive state of said Input/Output.

Similarly, the item of data from the compensation table intended to compensate a checksum coding an Input/Output whose state at the input to said maintenance filtering device is restrictive, and thus associated with the value Comp_a_0_1.C1 or respectively Comp_a_0_1.C2, is for example given by:

CompMaintenanceR00_i_1.C1=
  SESMiFalse.C1−SESiFalse.C1−Comp_a_0_1.C1
and respectively by
CompMaintenanceR00_i_1.C2=
  SESMiFalse.C2−SESiFalse.C2−Comp_a_0_1.C2

The above mentioned item of compensation data prevents a permissive state of the Input/Output from being taken into account.

The data from the compensation table associated with maintenance of the restrictive state of said Input/Output during said $T_i$−1 successive stages associated with the states characterized by the values Comp_a_0_t.C1 or respectively Comp_a_0_t.C2 of the pseudo-random generator are for example given by (t running from 2 to $T_i$):

CompMaintenanceR00_i_k.C1=
  SESMiFalse.C1−SESiFalse.C1−Comp_a_0_t.C1
CompMaintenanceR01_i_k.C1=
  SESMiFalse.C1−SESiTrue.C1−Comp_a_0_t.C1
and respectively
CompMaintenanceR00_i_k.C2=
  SESMiFalse.C2−SESiFalse.C1−Comp_a_0_t.C2
CompMaintenanceR01_i_k.C2=
  SESMiFalse.C2−SESiTrue.C2−Comp_a_0_t.C2

Thus, whatever the state of the Input/Output, the latter is maintained restrictive in the outgoing message.

Once the maintenance period has ended, i.e. after the pseudo-random generator has been in the state characterized by the value Comp_a_0_T.C2 (i.e. t=T) and verification of the date has been performed, in particular by means of the state Test Dckd of the pseudo-random generator, said pseudo-random generator must return either to the initial state characterized by the value Comp_a_1.C1 if the Input/Output of the new incoming message is characterized by a permissive state, or with the value Comp_a_0_1.C1 if the Input/Output of the new incoming message is characterized by a restrictive state. For this purpose, a second item of loop data originating in particular from the compensation table is preferably added to the value of the state Test Dckd of the pseudo-random generator in order to make it return to its value Comp_a_1.C1, or similarly a second item of loop data originating in particular from the compensation table is preferably added to the value of the state Test Dckd of the pseudo-random generator in order to the make it return to its value Comp_a_0_1.C1. Also, a first item of loop data is in particular capable of allowing the pseudo-random generator to return to its value Comp_a_1.C1 when said generator has processed a permissive input. Said first, second and third items of loop data are for example respectively given by:

CompLFSR1=Comp_a_1.C1−Test Dckd(Comp_a_1.C2)
CompLFSR2=Comp_a_1.C1−Test Dckd(Comp_a_0_T.C2)
CompLFSR3=Comp_a_0_1.C1−Test Dckd (Comp_a_0_T.C2)

Preferably, the date extraction device comprises in particular an extraction table providing first of all for the generation of the signatures $Sesm_i$ of Inputs/Outputs of a checksum by means of the values of the Inputs/Outputs $esm_i$ of the outgoing message, and secondly for the subtraction of the signatures of Inputs/Outputs $Sesm_i$ from the checksum $\Sigma Sesm_i$ in order to extract the date of said checksum. The extraction table and calculations associated with it are in particular confined, i.e. unusable for other calculations in order to avoid the mistaken construction of erroneous Inputs/Outputs messages with a correct checksum.

To summarize, the method and the device according to the invention present several advantages with respect to the existing methods and devices in that:

they avoid the need to use a coded processor,
they are economically advantageous in comparison with the methods and devices using a coded processor, since they make it possible to perform a protection maintenance function for an Input/Output without using a safety computer, and therefore without software, thus saving the need for numerous electronic components and hours of software engineering,
they provided for a greater Inputs/Outputs sampling frequency than that allowed by a software solution.

The invention claimed is:

1. A maintenance filtering method for maintenance filtering on a flow of m successive incoming messages $Es_j$ to be received at an input of a maintenance filtering device which is a hardware machine configured for processing the incoming messages $Es_j$ in order to generate an outgoing message $Esm_j$ at its output from each incoming message $Es_j$,
  wherein each incoming message $Es_j$ includes:
    a set of $n_j$ Inputs/Outputs $es_{i,j}$ (i=1, ..., $n_j$), each of which can be characterized by $s_i$ states $P_{q,i,j}$, each state $P_{q,i,j}$ being associated with a value $v_{q,i,j}$ to which the Input/Output $es_{i,j}$ is equal when in the state $P_{q,i,j}$;
    a checksum $\Sigma Ses_{i,j}$ of signatures $Ses_{i,j}$, each signature $Ses_{i,j}$ being intended to code the Input/Output $es_{i,j}$; and
    a date $d_j$ dating the checksum, the date being incremented by a date increment at each incoming message;
  the maintenance filtering method comprising:
  generating by the maintenance filtering device and from each incoming message $Es_j$ the outgoing message $Esm_j$, such that the outgoing message $Esm_j$ includes:
    a set of $n_j$ Inputs/Outputs $esm_{i,j}$, each of which can be characterized by the $s_i$ states $P_{q,i,j}$, a value $v_{q,i,j}$ of the Input/Output $esm_{i,j}$ of the outgoing message $Esm_j$ being equal to or different from the value $v'_{q,i,j}$ of the Input/Output $es_{i,j}$ of the incoming message $Es_j$ as a function of possible maintenance of the state $P_{q,i,j}$ of the Input/Output $es_{i,j}$;
    a checksum $\Sigma Sesm_{i,j}$ of signatures $Sesm_{i,j}$, each signature $Sesm_{i,j}$ being intended to code the Input/Output $esm_{i,j}$ as a function of a state of the Input/Output $es_{i,j}$; and
    the date $d_j$;
  and thereby calculating, using a calculation device, each checksum $\Sigma Sesm_{i,j}$ of the outgoing message $Esm_j$ by adding at least one compensation to the checksum $\Sigma Ses_{i,j}$, the compensation being calculated as a function of a current state of a pseudo-random generator and an item taken from a compensation table.

2. The maintenance filtering method according to claim 1, which comprises coupling the pseudo-random generator with a date extraction device capable of extracting at least one signature of a checksum.

3. The maintenance filtering method according to claim 1, which comprises splitting the checksum $\Sigma Sesm_{i,j}$ into c fields, with c being greater than or equal to 2.

4. The maintenance filtering method according to claim 1, which comprises, prior to receiving a first incoming message $Es_1$, initializing at least one pseudo-random generator for generating by way of the pseudo-random generator an initialization value capable of processing solely one state of an Input/Output intended not to be maintained.

5. The maintenance filtering method according to claim 1, which comprises, from the first incoming message $Es_1$ and for each consecutive incoming message $Es_j$:
   - if the Input/Output $es_{i,j}$ is in a state intended not to be maintained, executing a short LSFR cycle run by the pseudo-random generator associated with the Input/Output $es_{i,j}$;
   - if the Input/Output $es_{i,j}$ is in a state intended to be maintained, executing a long LSFR cycle run by the pseudo-random generator associated with the Input/Output $es_{i,j}$.

6. The maintenance filtering method according to claim 5, wherein the run of the short LSFR cycle and the run of the long LSFR cycle each comprises an addition, successively for each field of the checksum $\Sigma Ses_{i,j}$, of the field of the checksum $\Sigma Ses_{i,j}$ to a value characterizing the current state of the pseudo-random generator and to the item originating from the compensation table.

7. The maintenance filtering method according to claim 1, wherein the item originating from the compensation table is pre-defined as a function of the Input/Output $es_{i,j}$, its state and the checksum $\Sigma Ses_{i,j}$ in order to provide for either a generation of a check signature $Sesm_{i,j}$ characterizing a maintenance of the state of an Input/Output for a period $T_i$, or a generation of a check signature $Sesm_{i,j}$ characterizing a confirmation of the state of an Input/Output of an incoming message.

8. The maintenance filtering method according to claim 1, which comprises verifying a date increment between two consecutive messages.

9. A maintenance filtering device being a hardware machine for processing a flow of m incoming messages $Es_j$ in order to generate from each incoming message $Es_j$ an outgoing message $Esm_j$
   each incoming message $Es_j$ including:
   - $n_j$ Inputs/Outputs $es_{i,j}$,
   - a checksum $\Sigma Ses_{i,j}$ of signatures $Ses_{i,j}$, each signature $Ses_{i,j}$ being intended to code the Input/Output $es_{i,j}$, and
   - a date $d_j$;
   the outgoing message $Esm_j$ including:
   - $n_j$ Inputs/Outputs $esm_{i,j}$,
   - a checksum $\Sigma Sesm_{i,j}$ of signatures $Sesm_{i,j}$, each signature $Sesm_{i,j}$ being intended to code said Input/Output $esm_{i,j}$, and
   - the date $d_j$;
   the filtering device being configured to maintain at least one state of at least one Input/Output $es_{i,j}$ of at least one of the incoming messages $Es_j$ for a period of time Ti whatever a state of an $i^{th}$ Input/Output of an incoming message consecutive to the incoming message $Es_j$ by generating at least one outgoing message characterized in that the state of the $i^{th}$ Input/Output of the outgoing message is equal to the state of the Input/Output $es_{i,j}$ of the incoming message $Es_j$, and the filtering device comprising:
   - a calculation device configured for calculating for each incoming message $Es_j$ from the checksum $\Sigma Ses_{i,j}$ and by adding at least one compensation to the checksum $\Sigma Ses_{i,j}$, a checksum $\Sigma Sesm_{i,j}$ intended to characterize the outgoing message $Esm_j$;
   - at least one pseudo-random generator with a current state intended to calculate the compensation; and
   - at least one compensation table for calculating the compensation.

10. The maintenance filtering device according to claim 9, wherein said calculation device, each said pseudo-random generator, and each said compensation table are coupled with one another in order to generate the compensation.

11. The maintenance filtering device according to claim 9, wherein said calculation device comprises at least one hard-wired algorithm.

12. The maintenance filtering device according to claim 9, further comprising a date extraction device to be coupled to said pseudo-random generator.

13. The maintenance filtering device according to claim 9, wherein the compensation table comprises predetermined data, each item of data being predefined as a function of a current state of the pseudo-random generator, the Input/Output $es_{i,j}$, of a state thereof and the check signature $Ses_{i,j}$ in order to provide for either a generation of a check signature $Sesm_{i,j}$ characterizing a maintenance of the state of an Input/Output for a period $T_i$, or a generation of a check signature $Sesm_{i,j}$ characterizing a confirmation of the state of an Input/Output of an incoming message.

14. The maintenance filtering device according to claim 9, which further comprises at least one adder.

15. The maintenance filtering device according to claim 9, further comprising a date extraction device configured for extracting the date of at least one checksum, an incoming message or an outgoing message, and of determining a date increment between two successive messages processed by the maintenance filtering device.

* * * * *